Jan. 20, 1959   H. NERWIN ET AL   2,869,748
TRANSPARENCY MOUNTING DEVICE
Filed July 5, 1957   4 Sheets-Sheet 1

HUBERT NERWIN
DOUGLASS C. HARVEY
INVENTORS

BY
ATTORNEYS

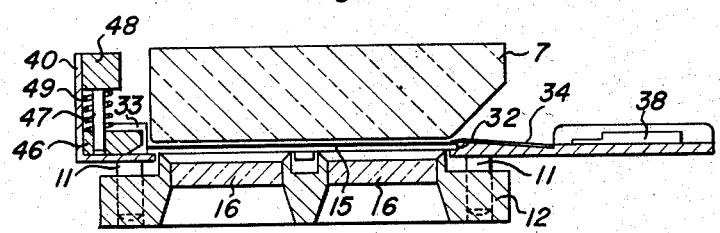
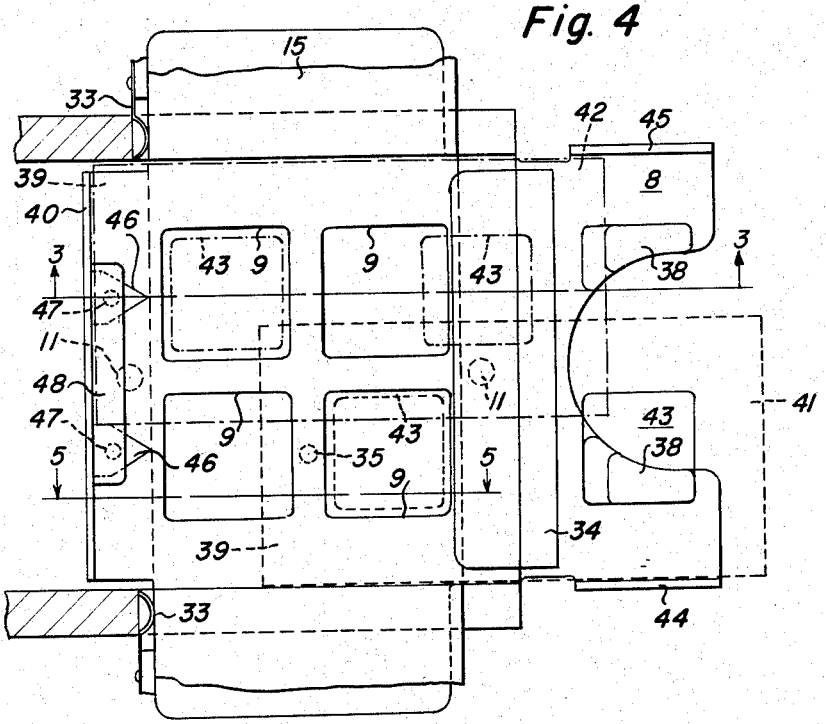
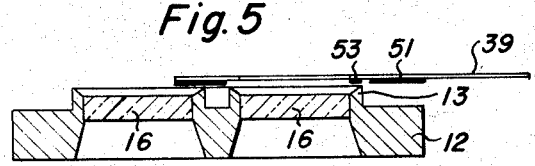
HUBERT NERWIN
DOUGLASS C. HARVEY
INVENTORS
ATTORNEYS Jan. 20, 1959  H. NERWIN ET AL  2,869,748
TRANSPARENCY MOUNTING DEVICE Filed July 5, 1957  4 Sheets-Sheet 3

HUBERT NERWIN
DOUGLASS C. HARVEY
INVENTORS

BY

ATTORNEYS

HUBERT NERWIN
DOUGLASS C. HARVEY
INVENTORS

ATTORNEYS

2,869,748
TRANSPARENCY MOUNTING DEVICE

Hubert Nerwin and Douglass C. Harvey, Rochester, N. Y., assignors to Eastman Kodak Company, Rochester, N. Y., a corporation of New Jersey Application July 5, 1957, Serial No. 670,311

10 Claims. (Cl. 216—22)

This invention relates generally to a film mounting apparatus and more specifically to a device adapted to simultaneously sever a selected film transparency and tack the severed transparency to a film mount.

A known type of camera may produce a number of different exposures on a single film. A film strip such as shown in Fig. 10 may result from such a camera. The film strip shows four exposures or groups of images, each group having four identical images varying only in the degree of exposure. It is necessary to select the best transparency or image from each group of image areas taken and mount it in a suitable film mount for projecting or printing. The film mount for receiving the transparency is of the normal type as shown in Fig. 11 formed from a single piece of cardboard that is scored along its center line to provide two hinged flaps which are adapted to be arranged in overlapping relation with the transparency positioned or sandwiched therebetween. The flaps are provided with registering apertures which are of sufficient size to frame the image area of the transparency. The balance of the transparency extends beyond the edges of the apertures and is surrounded by an adhesive spacer element secured to the marginal edges of one of the flaps. The flaps are of larger dimensions than the transparency so as to extend beyond all sides of the latter as is well known. When film transparencies are mounted within a film mount of the foregoing type, it is necessary to tack the transparency in an operative position in the transparency receiving area framed by the spacer element before the mount is folded and sealed. The tacking is necessary to assure that the entire picture-bearing area of the transparency is viewable through the apertures and to eliminate the possibility of an undesirable portion of the transparency beyond the picture area appearing in the aperture viewing area. The tacking also eliminates any possible twisting or skewing of the transparency prior to sealing which would otherwise result in improper orientation of the transparency with respect to the apertures.

Therefore, one of the objects of the present invention is to provide a device adapted to simultaneously sever a selected film transparency and tack the severed transparency to a film mount.

Another object of the invention is the provision of an improved film mounting device having film orientation means for properly positioning the film thereon.

One more object of the invention is to provide an improved film mounting device having guide means for properly guiding the film mount into one of several transparency receiving positions.

Another object of this invention is the provision of an improved film mounting device adapted to sever a selected transparency or image area from a group of image areas on a film strip without moving the film strip in the mounting device, assuming that the film strip is initially positioned with the image areas in a mounting position in the film mounting device.

A further object of the invention is to provide a film mounting device of simple design, constructed of few parts, thoroughly reliable and efficient in operation, and economical in manufacture.

Still another and more specific object of this invention is to provide a film mounting device having a beveled cutting die adapted to simultaneously sever a selected film transparency, and urge the edge of the transparency into engagement with the film mount to tack the transparency thereto.

Objects and advantages other than those set forth above will be apparent from the following description when read in connection with the accompanying drawings, in which:

Fig. 3 is a section view taken along line 3—3 of Fig. 4;

Fig. 4 is an enlarged plan view of the film mounting device showing a film thereon, and indicating by dotted and broken lines two possible positions of a film mount placed over the film;

Fig. 5 is a section view taken along line 5—5 of Fig. 4;

Figure 1:
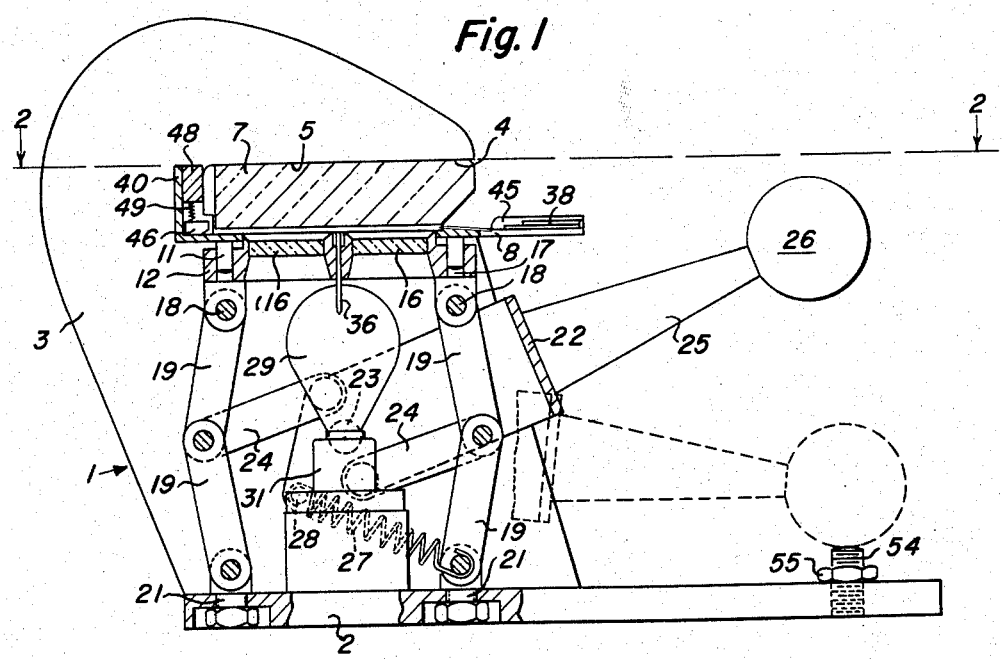
Fig. 1 is a side elevation view partly in section of the film mounting device of this invention.
Figure 2:
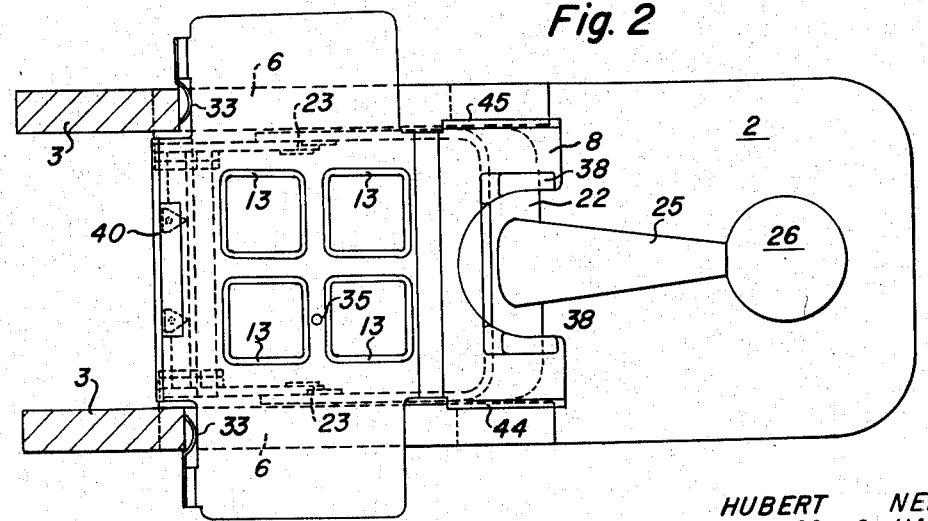
Fig. 2 is a view partly in section of the film mounting device taken along line 2—2 of Fig. 1.
Figure 6:
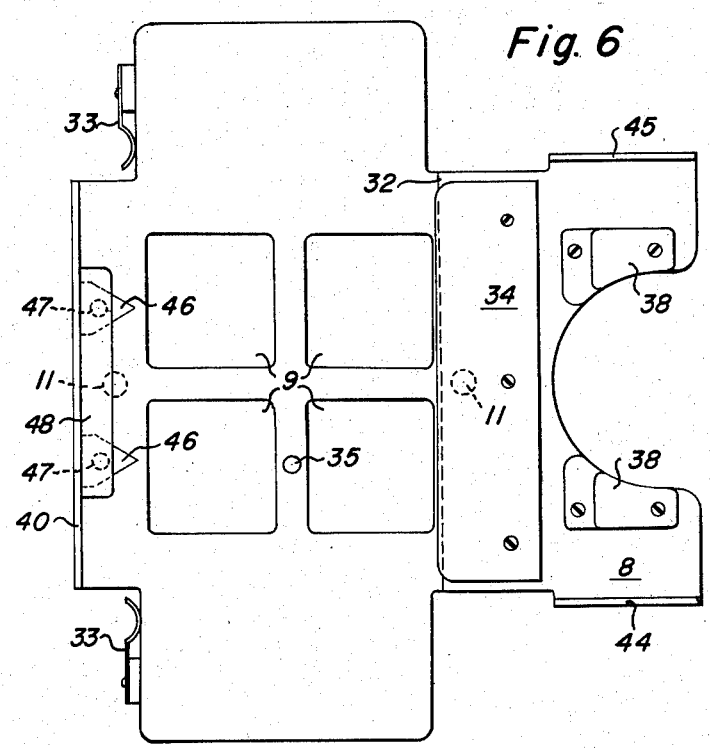
Fig. 6 is a plan view of the guide plate of the film mounting device.

As shown in the drawings, this invention is embodied in a mounting device 1 having a base 2 and a pair of spaced apart frame members 3 transverse to the base 2 and integral therewith. The frame members 3 each have an elongated slot 4 near the upper end thereof extending inwardly from one side and forming upper and lower frame surfaces 5, 6 respectively parallel to the base 2. An anvil 7 of glass or any other transparent material adapted to permit the operator to see therethrough is secured to the upper frame surfaces 5. A guide plate 8 as best seen in Fig. 6 having four openings 9 and a pair of transversely extending guide pins 11 is secured by any suitable means to the lower surfaces 6 of the frame members 3. A cutting die platen 12 molded as one piece has four cutting dies 13, each die shown in Fig. 7 as a continuous beveled knife defining a substantially square opening roughly corresponding to the size of an image area 14 of a film strip 15. A diffusion screen 16 of glass is mounted within each of the openings formed by the knives. The die platen 12 further has openings 17 for receiving the guide pins 11, and rods 18 as seen in Fig. 1 carried by the platen for connecting it to an actuating device adapted to impart a reciprocal movement to the die platen 12 on the guide pins 11. The actuating device comprises hinged link members 19 connected to the rods 18 at one end and to bearing posts 21 secured to the base 2 at the other end. A U shaped bracket 22 pivotally mounted on studs 23 shown dotted in Fig. 1 carried by the frame members 3 has links 24 connecting the ends of the bracket 22 to the hinged portion of the link members 19. The bracket 22 further has a lever 25 secured thereto, which is provided with a handle 26. A spring 27 has one end connected to a pin 28 carried by the bracket 22 and the other end secured to one of the bearing posts 21 to pivotally urge the bracket 22 against the rod 18 causing the links 19 and 24 to move the die platen 12 downwardly into its lowermost or non-mounting position as seen in Fig. 1.

A strip of thin sheet metal, not shown, is wrapped around the frame members 3 and secured thereto by cap screws to partially enclose the actuating device and die platen 12. An illuminating lamp 29 is carried by a suitable lamp receptacle 31 mounted on the base 2 and centrally located under the die platen 12 to illuminate the film 15 through the diffusion screens 16 so that it may be viewed through the glass anvil 7.

Figure 7:
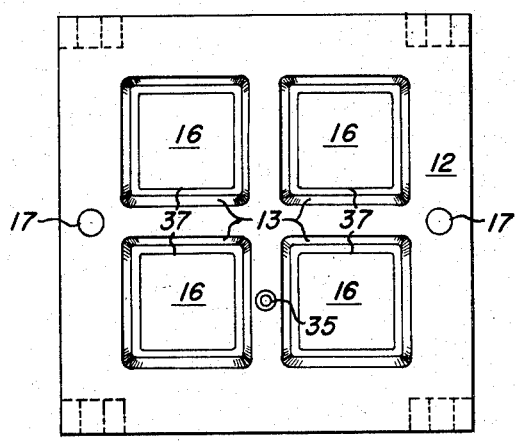
Fig. 7 is a plan view of the die platen of the film mounting device.
Figure 8:
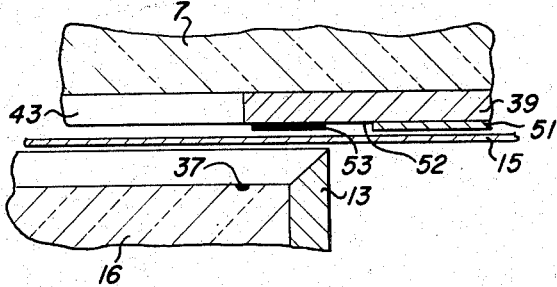
Fig. 8 is an enlarged fragmentary view of a portion of the structure of Fig. 5.
Figure 10:
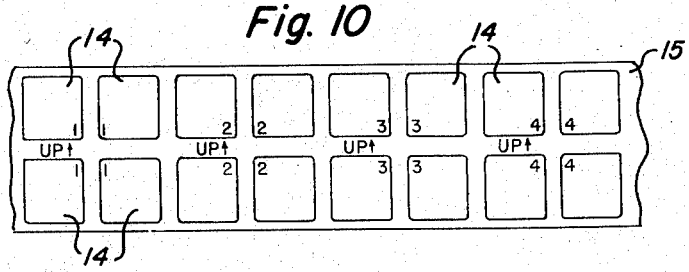
Fig. 10 is a reduced fragmentary plan view of an exposed web of film showing four groups of multiple exposures, each group having four identical image areas differing only in the degree of exposure, and an enlarged orientation mark for each group.

A web of exposed film 15 such as shown in Fig. 10 is positioned in the mounting device 1 on the guide plate 8 as shown in Figs. 3 and 4. The guide plate 8 has a shoulder 32 for receiving one edge of the film 15, and the other edge of the film bears against a pair of leaf springs 33 mounted on the plate 8. A thin flexible lid 34 of metal or plastic is secured to the plate 8 with a portion thereof extending over the shoulder 32 to properly guide the film 15 between the shoulder 32 and the springs 33. To facilitate rapid but not entirely accurate positioning of a group of transparencies or image areas 14 in the viewing area of the guide plate 8, the film 15 is moved along the guide plate until a fiducial mark "Up" along with an arrow which is provided on the film for each exposure registers with a small window 35 in the die platen 12 and is illuminated through an illuminating rod 36 disposed below the window 35 as seen in Fig. 1. The diffusion screens 16 carried by the cutting dies 13 are provided with an inscribed line 37 as shown in Fig. 7 clearly visible by means of the illuminating lamp 29 to mark out the exact outer boundary of the transparency or image area 14 to provide an extremely accurate means for orienting the film transparency with respect to the cutting die members 13.

Figure 11:
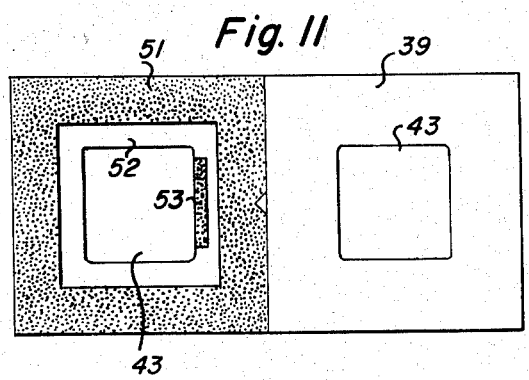
Fig. 11 is a front elevation view showing a film mount.

The guide plate 8 is provided with locating means comprising stepped bosses 38 for positioning a film mount 39, such as shown in Fig. 11, in the mounting device in one of four possible positions depending on which one of the four image areas 14 is to be selected and mounted. The film mount 39 is of a well known type as described earlier having an adhesive spacer element 51 surrounding a transparency receiving area 52. The film mount 39 further has a strip of pressure-sensitive adhesive 53 positioned parallel and adjacent to one edge of an aperture 43, although the adhesive may be placed directly onto the film strip. Two of the four possible positions 41 and 42 of the film mount 39 are indicated by dotted and broken lines respectively in Fig. 4. In position 41, the boss 38 extends through one of the film mount apertures 43 and bears against two of the sides of the aperture 43 to prevent longitudinal movement of the mount 39. The mount is prevented from lateral movement by one edge of the boss 38 and a flange 44 carried by the plate. In position 42, the mount 39 is prevented from longitudinal movement by an upturned lip 40 of the plate 8 and one edge of the boss 38 bearing against the end of the mount. Lateral movement of the mount 39 is prevented by a flange 45 similar to flange 44 and one of two V shaped guide members 46 mounted on the rear end of the guide plate 8, the other guide member tending to hold the mount in its located position. The guide members 46 which are best shown in Fig. 3 have openings for receiving pins 47 extending from a bar 48 secured to the lip 40. A helical spring 49 is interposed between each guide member 46 and bar 48 to urge the members against the plate 8. The members 46 are V shaped to form cam surfaces for guiding one of the corners of the film mount 39 into the proper position between one edge of the guide member 46 and the frame member 3.

Figure 9:
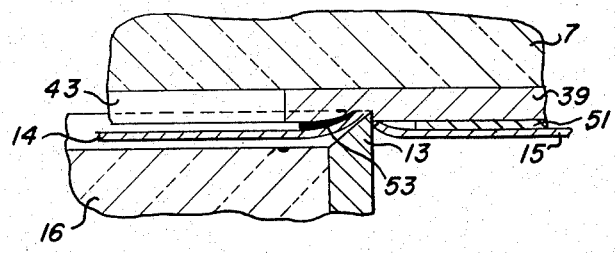
Fig. 9 is an enlarged fragmentary view similar to Fig. 8 showing the cutting die simultaneously severing and tacking a transparency to the film mount.

In the operation of this invention, an electric cord, not shown, connects the lamp 29 to a suitable power supply to illuminate the lamp. A strip of exposed film 15 such as shown in Fig. 10 is threaded onto the guide plate 8 with one edge of the film engaging the shoulder 32 under the lip 34 and the other edge bearing against the locating springs 33. The film strip 15 is moved along the guide plate 8 until the mark "Up" and arrow appears illuminated in the window 35. The operator then observes the appearance of the group of four identical image areas 14, and selects the best one of the group which we will assume is the lower right hand transparency as viewed in Fig. 4. The operator adjusts the film strip 15 until the image area 14 falls within the inscribed lines 37 of the screen 16. The film mount 39 is placed on the guide plate 8 in the position 41 with the transparency receiving area 52 positioned over and facing the lower right hand transparency 14. The lever 25 of the mounting device 1 is moved downwardly onto a transparency mounting position shown dotted in Fig. 1, initial movement of the lever causing the links 19 and 24 to move the die platen 12 upwardly into engagement with the film strip 15. Upon initial contact, the beveled cutting knife 13 corresponding to the lower right hand transparency urges the film strip 15 into the transparency receiving area 52 of the mount 39. The film strip is moved into contact with the pressure sensitive adhesive 53, and the film mount 39 against the glass anvil 7. Further upward movement of the die platen 12 into the transparency mounting position causes the beveled knife 13 to simultaneously sever and tack the transparency 14 to the film mount 39 with the beveled portion of the knife 13 urging the edges of the transparency 14 inwardly as shown in Fig. 9 into engagement with the pressure sensitive adhesive 53. The beveled knife 13 is forced partially through the film mount 39 which acts as the backing plate. The depth of penetration of the film mount 39 by the knife 13 is controlled by an adjusting screw 54 and lock nut 55 shown in Fig. 1 which provides an adjustable stop means for the handle 26, shown dotted. The stop means accordingly controls how far the die platen 12 may be reciprocally moved toward the anvil 7 when the lever is moved against the stop into the transparency mounting position. The remaining cutting knives 13 partially sever the corresponding nonselected transparencies 14 since a portion of the film mount 39 is interposed between a part of the remaining knives 13 and the anvil 7 to act as a backing plate as seen in Fig. 4. Since the adjusting screw 54 is adjusted so that the knives 13 do not contact the glass anvil 7 as seen in Fig. 9, the film strip 15 in the absence of a film mount 39 is merely moved upwardly by the knives toward the anvil 7. Only those portions of the film strip 15 that are backed up by the film mount 39 are severed by the cutting knives 13. The cutting knives after severing the portions of the film strip are forced partially through the film mount wherever the knives are in engagement with the mount.

Although but one embodiment has been illustrated and described, it will be apparent to those skilled in the art that various changes and modifications may be made therein without departing from the spirit of the invention or from the scope of the appended claims.

We claim:

1. In a mounting device adapted to select a transparency or image area from a film strip and to simultaneously sever and tack the selected transparency to the transparency receiving area of a film mount, at least one of which is provided with a pressure sensitive adhesive, the combination of: a support member; a transparent anvil carried by said support member; a guide plate carried by said support member below and in register with said anvil and spaced apart therefrom to form a passageway, said plate further having passage means; film guiding means carried by said guide plate for receiving and guiding a strip of film through said passageway; locating means carried by said guide plate for selectively positioning a film mount in said passageway over said film in one of several possible positions with said transparency receiving area in register with and facing a selected image area; a die platen positioned below and in register with said guide plate and reciprocally movable with respect thereto; a plurality of cutting members formed by said die platen facing said plate and adapted to pass through said passage means of said plate toward said anvil upon reciprocal movement of said die platen, each of said cutting members having a continuous beveled knife defining an opening; illuminating means carried by said device for illuminating said film through said openings; positioning means for positioning said film on said guide plate with one of said groups of image areas in register with said cutting members; stop means for limiting how far said die platen may be reciprocally moved toward said anvil; and actuating means for reciprocally moving said die platen from a non-mounting position in which said cutting members are out of engagement with said film into a transparency mounting position into engagement with said stop means whereby one of said cutting members urges said film and said film mount against said anvil, said beveled knife of said one cutting member further penetrating partly through said mount to simultaneously sever said selected transparency and urge one edge thereof against said film mount with said adhesive therebetween to tack said transparency to said film mount.

2. The invention as defined in claim 1 wherein the support member comprises a base and a pair of spaced apart frame members carried by said base, said frame members each having an elongated slot near the upper end thereof extending inwardly from one side thereof for receiving said anvil and said guide plate.

3. The invention as defined in claim 1 wherein said film guiding means comprises a shoulder formed by said plate, a flexible lid mounted on said plate and having a portion thereof extending over said shoulder and cooperating therewith to form a channel for guiding one edge of said film, and a spring mounted on said plate adapted to engage and guide the other edge of said film.

4. The invention as defined in claim 1 wherein said locating means comprises a stepped boss carried by said plate, a flange formed by said plate and spaced apart from said boss, and a pair of spaced apart, V-shaped, spring biased guide members carried by said plate, one of which is adapted to guide and locate one end of a film mount while said other member holds the film mount in the located position.

5. The invention as defined in claim 1 wherein said positioning means comprises a window carried by said plate, an illuminating rod in register with said window and cooperating with said illuminating means to illuminate said window for viewing an orientation mark carried by said film, a diffusion screen mounted in said opening formed by said cutting member, and a line inscribed on said screen defining the exact outer boundary of an image area.

6. The invention as defined in claim 1 wherein said actuating means comprises a linkage system connecting said die platen to the base of said support member, a lever pivotally mounted on said support member and having one end connected to said linkage system, a spring connecting said lever to said base for biasing said lever and linkage system in a direction reciprocally moving said die platen into a non-mounting position, and a handle on the other end of said lever adapted when moved in the opposite direction to actuate said linkage system against the bias of said spring reciprocally moving said die platen against said stop means into a transparency mounting position.

7. The invention as defined in claim 1 wherein said stop means comprises an adjustable screw carried by said base adapted to engage a part of said lever.

8. In a mounting device adapted to select a transparency or image area from a film strip and to simultaneously sever and tack the selected transparency to the transparency receiving area of a film mount, at least one of which is provided with a pressure sensitive adhesive, the combination of: a base; a pair of spaced apart frame members carried by said base, said frame members each having an elongated slot near the upper end extending inwardly from one side thereof and defining spaced apart upper and lower frame surfaces parallel to said base; a transparent anvil secured to said upper frame surfaces; a guide plate secured to said lower frame surfaces in register with said anvil and spaced apart therefrom to form a passageway, said plate further having a plurality of passages therethrough and a guide pin transverse thereto; film guiding means carried by said guide plate including a shoulder formed by said plate, a flexible lid mounted on said plate and having a portion thereof extending over said shoulder and cooperating therewith to form a channel for guiding one edge of said film, and a spring mounted on said plate adapted to engage and guide the other edge of said film; locating means carried by said guide plate for selectively positioning a film mount in said passageway over said film in one of several possible positions with said transparency receiving area in register with and facing a selected image area, said locating means including a stepped boss carried by said plate, a flange formed by said plate and spaced apart from said boss, and a V-shaped, spring biased guide member carried by said plate adapted to guide and locate one end of a film mount; a die platen positioned below and in register with said guide plate and having holes for receiving said guide pins for reciprocal movement of said die platen thereon; a plurality of cutting members formed by said die platen in register with said passages in said plate, each of said cutting members having a continuous beveled knife defining an opening; a diffusion screen disposed in said opening; a lamp carried by said base for illuminating said film through said diffusion screens; positioning means including a window carried by said plate illuminated by said lamp, and a line inscribed on said screen defining the exact outer boundary of an image area for accurately positioning said film on said guide plate with one of said groups of image areas in register with said cutting members; a linkage system connecting said die platen to said base; a lever pivotally mounted on said frame members and having one end connected to said linkage system; a spring connecting said lever to said base for biasing said lever and linkage system into a non-mounting position; an adjustable stop means including an adjusting screw carried by said base and adapted to engage said lever for limiting how far said die platen may be reciprocally moved toward said anvil; and a handle on the other end of said lever adapted when moved into engagement with said stop means to reciprocally move said die platen against the bias of said spring into a transparency mounting position whereby one of said cutting members urges said film and said film mount against said anvil, said beveled knife of said one cutting member further penetrating partly through said mount to simultaneously sever said selected transparency and urge one edge thereof against said film mount with said adhesive therebetween to tack said transparency to said film mount.

9. In a mounting device adapted to select a transparency or image area from a film strip and to simultaneously sever and tack the selected transparency to the transparency receiving area of a film mount, at least one of which is provided with a pressure sensitive adhesive, the combination of: a support member; a transparent anvil carried by said support member; a guide plate carried by said support member below and in register with said anvil and spaced apart therefrom to form a passageway, said plate further having passage means; film guiding means carried by said guide plate for receiving and guiding a strip of film through said passageway; locating means carried by said guide plate for selectively positioning a film mount in said passageway over said film in one of several possible positions with said transparency receiving area in register with and facing a selected image area; a die platen positioned below and in register with said guide plate and reciprocally movable with respect thereto; a plurality of cutting members formed by said die platen facing said plate and adapted to pass through said passage means of said plate toward said anvil upon reciprocal movement of said die platen, each of said cutting members defining an opening; illuminating means for illuminating said film through said openings; positioning means for positioning said film on said guide plate with one of said groups of image areas in register with said cutting members; stop means for limiting how far said die platen may be reciprocally moved toward said anvil; and actuating means for reciprocally moving said die platen from a non-mounting position in which said cutting members are out of engagement with said film into a transparency mounting position into engagement with said stop means whereby one of said cutting members urges said film and said film mount against said anvil, said one cutting member further penetrating partly through said mount to simultaneously sever said selected transparency and urge one edge thereof against said film mount with said adhesive therebetween to tack said transparency to said film mount.

10. In a mounting device adapted to select a transparency or image area from a film strip and to simultaneously sever and tack the selected transparency to the transparency receiving area of a film mount, at least one of which is provided with a pressure sensitive adhesive, the combination of: a support member; a transparent anvil carried by said support member; a guide plate carried by said support member below and in register with said anvil and spaced apart therefrom to form a passageway, said plate further having passage means; film guiding means carried by said guide plate for receiving and guiding a strip of film through said passageway; locating means carried by said guide plate for selectively positioning a film mount in said passageway over said film in one of several possible positions with said transparency receiving area in register with and facing a selected image area; a die platen positioned below and in register with said guide plate and reciprocally movable with respect thereto; a plurality of cutting members formed by said die platen facing said plate and adapted to pass through said passage means of said plate toward said anvil upon reciprocal movement of said die platen, each of said cutting members defining an opening; illuminating means for illuminating said film through said openings; stop means for limiting how far said die platen may be reciprocally moved toward said anvil; and actuating means for reciprocally moving said die platen from a non-mounting position in which said cutting members are out of engagement with said film into a transparency mounting position into engagement with said stop means whereby one of said cutting members urges said film and said film mount against said anvil, said one cutting member further penetrating partly through said mount to simultaneously sever said selected transparency and urge one edge thereof against said film mount with said adhesive therebetween to tack said transparency to said film mount.

References Cited in the file of this patent

UNITED STATES PATENTS

| | | |
|---|---|---|
| 2,472,619 | Reed | June 7, 1949 |
| 2,588,087 | Connor et al. | Mar. 4, 1952 |
| 2,591,519 | Decker | Apr. 1, 1952 |